(12) United States Patent
Taylor et al.

(10) Patent No.: US 10,655,634 B2
(45) Date of Patent: May 19, 2020

(54) MULTI-PIECE COMPRESSOR WHEEL

(71) Applicant: BorgWarner Inc., Auburn Hills, MI (US)

(72) Inventors: Andrew John Taylor, Mirfield (GB); Charlie Terry, Halifax (GB); Christian Ellis, Baildon (GB)

(73) Assignee: BorgWarner Inc., Auburn Hills, MI (US)

( * ) Notice: Subject to any disclaimer, the term of this patent is extended or adjusted under 35 U.S.C. 154(b) by 358 days.

(21) Appl. No.: 15/639,468

(22) Filed: Jun. 30, 2017

(65) Prior Publication Data

US 2019/0003482 A1   Jan. 3, 2019

(51) Int. Cl.
| | |
|---|---|
| *F04D 29/28* | (2006.01) |
| *F04D 29/02* | (2006.01) |
| *F04D 17/10* | (2006.01) |
| *F04D 25/06* | (2006.01) |
| *F04D 29/42* | (2006.01) |
| *F04D 29/26* | (2006.01) |
| *B29D 99/00* | (2010.01) |
| *F04D 29/053* | (2006.01) |
| *F04D 29/62* | (2006.01) |
| *F04D 29/66* | (2006.01) |

(52) U.S. Cl.
CPC ........... *F04D 29/284* (2013.01); *F04D 17/10* (2013.01); *F04D 25/06* (2013.01); *F04D 29/023* (2013.01); *F04D 29/4206* (2013.01); *B29D 99/0025* (2013.01); *F04D 29/053* (2013.01); *F04D 29/266* (2013.01); *F04D 29/624* (2013.01); *F04D 29/662* (2013.01); *F05D 2230/30* (2013.01); *F05D 2260/94* (2013.01); *F05D 2300/10* (2013.01); *F05D 2300/43* (2013.01)

(58) Field of Classification Search
CPC .... F04D 29/284; F04D 29/4206; F04D 25/06; F04D 17/10; F04D 29/662; F04D 29/624; F04D 29/053; F04D 29/023; F04D 29/266; B29D 99/0025; F05D 2300/10; F05D 2260/94; F05D 2230/30; F05D 2300/43
See application file for complete search history.

(56) References Cited

U.S. PATENT DOCUMENTS

| | | |
|---|---|---|
| 4,706,928 A | 11/1987 | Hyll |
| 5,193,989 A | 3/1993 | Fleury et al. |
| 5,741,123 A | 4/1998 | Pauly |
| 6,588,485 B1 | 7/2003 | Decker |

(Continued)

FOREIGN PATENT DOCUMENTS

| | | |
|---|---|---|
| JP | S57 82865 U | 5/1982 |
| JP | H03 10040 A | 1/1991 |

(Continued)

*Primary Examiner* — Xiao En Mo
(74) *Attorney, Agent, or Firm* — Young Basile Hanlon & MacFarlane, P.C.

(57) ABSTRACT

A compressor wheel assembly for a forced induction device includes an impeller member and a plate member. The impeller member is formed of a polymer material, and includes a hub portion and a plurality of blades extending from an outer surface of the hub portion. The hub portion includes an outer peripheral portion formed therewith. The plate member is connected to the outer peripheral portion of the impeller member to be rotationally fixed thereto. The plate member being formed of a metal material.

19 Claims, 9 Drawing Sheets

(56) References Cited

U.S. PATENT DOCUMENTS

| | | | |
|---|---|---|---|
| 8,061,031 B2 | 11/2011 | Ranz et al. | |
| 8,794,914 B2 * | 8/2014 | Hommes | F04D 29/023 415/206 |
| 2003/0037546 A1 | 2/2003 | Kapich | |
| 2011/0223007 A1 | 9/2011 | Hammel et al. | |
| 2014/0056737 A1 | 2/2014 | Panambur et al. | |
| 2016/0076554 A1 * | 3/2016 | Rosen | F04D 29/444 415/207 |
| 2016/0281648 A1 * | 9/2016 | Annati | F01D 25/16 |

FOREIGN PATENT DOCUMENTS

| | | |
|---|---|---|
| JP | H05 296193 A | 11/1993 |
| JP | H11 351192 A | 12/1999 |
| WO | 2008050915 A1 | 5/2008 |

* cited by examiner

MULTI-PIECE COMPRESSOR WHEEL

CROSS-REFERENCE TO RELATED APPLICATION(S)

None.

TECHNICAL FIELD

This disclosure relates to forced induction devices and, in particular, compressor wheels thereof.

BACKGROUND

Forced induction devices, such as turbochargers and superchargers, supply compressed air to internal combustion engines, which may increase power output thereof. Forced induction devices include compressor wheels that, when rotated, draw ambient air into the forced induction device, and expel the air at an increased pressure (i.e., expel compressed air). Compressor wheels are typically manufactured from a solid metal material (e.g., cast and/or machined aluminum). Compressor wheels may also be made from a polymer material, which may be advantageous to reduce mass and inertia as compared to a solid metal wheel. However, such polymer materials may be subject to increased deformation and stress, as compared to solid metal compressor wheels, due to the polymer material thereof being less stiff than the metal material.

SUMMARY

Disclosed herein are implementations of compressor wheels for forced induction devices and forced induction devices comprising the same.

In one implementation, a compressor wheel assembly for a forced induction device includes an impeller member and a plate member. The impeller member is formed of a polymer material, and includes a hub portion and a plurality of blades extending from an outer surface of the hub portion. The hub portion includes an outer peripheral portion formed therewith. The plate member is connected to the outer peripheral portion of the impeller member to be rotationally fixed thereto. The plate member being formed of a metal material.

A first axial surface of the plate member may be mated against a first axial surface of the impeller member. The outer peripheral portion may extend to within at least 25% of a radius of an outer circumference of the impeller member. The impeller member may be an injection molded component. The plate member may be a stamped component. The plate member may be connected to the outer peripheral portion of the impeller member by at least one of crimping or bonding.

In an implementation, a forced induction device includes a compressor wheel, an electric motor, and a housing. The impeller member is formed of a polymer material, extends from an inducer end to an exducer end, and includes a plurality of blades. The plate member is formed of a metal material and is connected to an outer peripheral portion of the impeller member at the exducer end continuously therearound. The compressor wheel is rotated in the housing by the electric motor to draw air axially into the housing at the inducer end and to expel air radially out of the housing at the exducer end.

In an implementation, a method is provided for manufacturing compressor wheels for forced induction devices. The method includes injection molding an impeller member with a polymer material, and forming a plate member of a metal material. The method also includes connecting the plate member to the impeller member at the exducer end of the impeller member to form a compressor wheel. The method further includes balancing the compressor wheel by removing a portion of the metal material from the plate member.

The method may also include injection molding another impeller member having a different geometry from the impeller member, forming another plate member having a common design as the plate member, and connecting the other plate member to the other impeller member to form another compressor wheel.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Disclosed herein are embodiments of compressor wheels for forced induction devices (e.g., an electric turbocharger), which may be used to supply compressed air to an internal combustion engine of a vehicle powertrain. The compressor wheels are multi-piece assemblies, which generally include an impeller member formed of a polymer material and a plate member formed of a metal material. The plate member is connected to an outer peripheral portion (e.g., an outer circumference) of the impeller member to form the compressor wheel. The outer peripheral portion is arranged at an exducer end of the impeller member, which may be formed and coupled to in different manners. The outer peripheral portion may also extend radially outward to or near a maximum circumference of the impeller member.

Figure 1A:
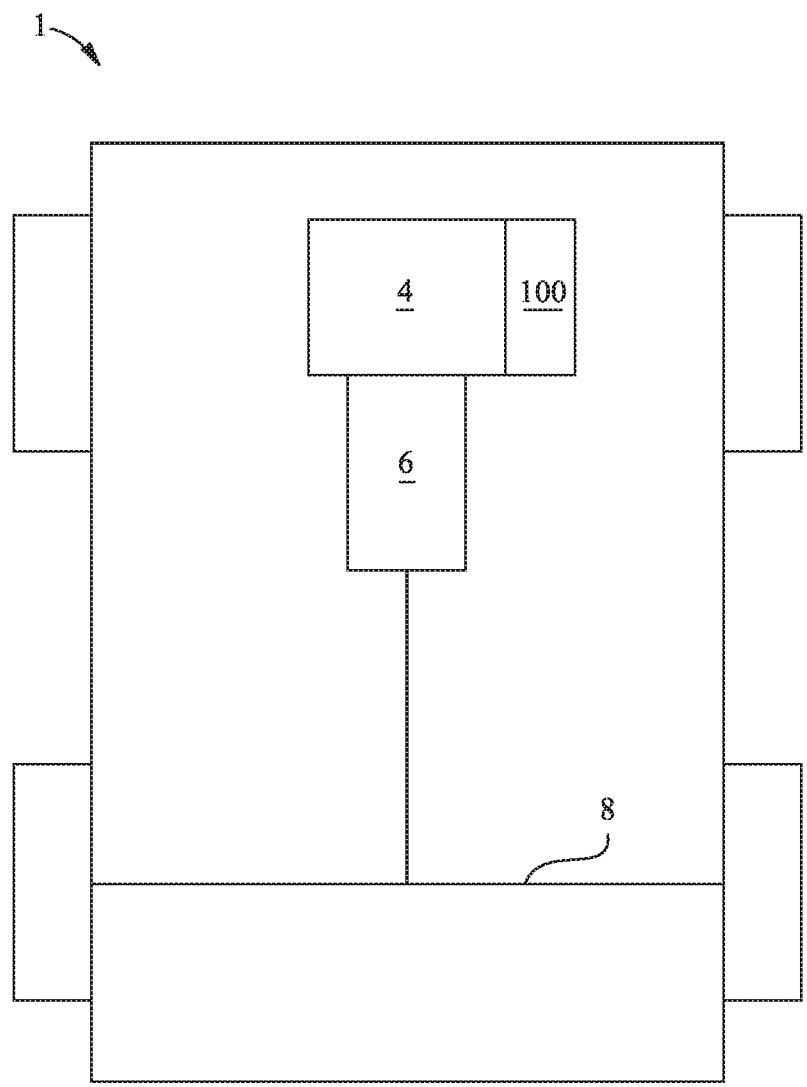
FIG. 1A is a schematic view of a vehicle having a powertrain.

Referring to FIG. 1A, a vehicle 1 includes a powertrain having an engine 4 (or other drive source), a transmission 6, and axles 8. The engine 4 provides an output torque to the transmission 6 from which torque is transferred to one or more of the axles 8 (e.g., a rear axle in rear-wheel drive vehicle). The axles 8 may be assemblies that include a differential and two half-shafts that each extend to a wheel (not labeled). The powertrain additionally includes a forced induction device 100, which supplies compressed air to the engine 4.

Figure 1B:
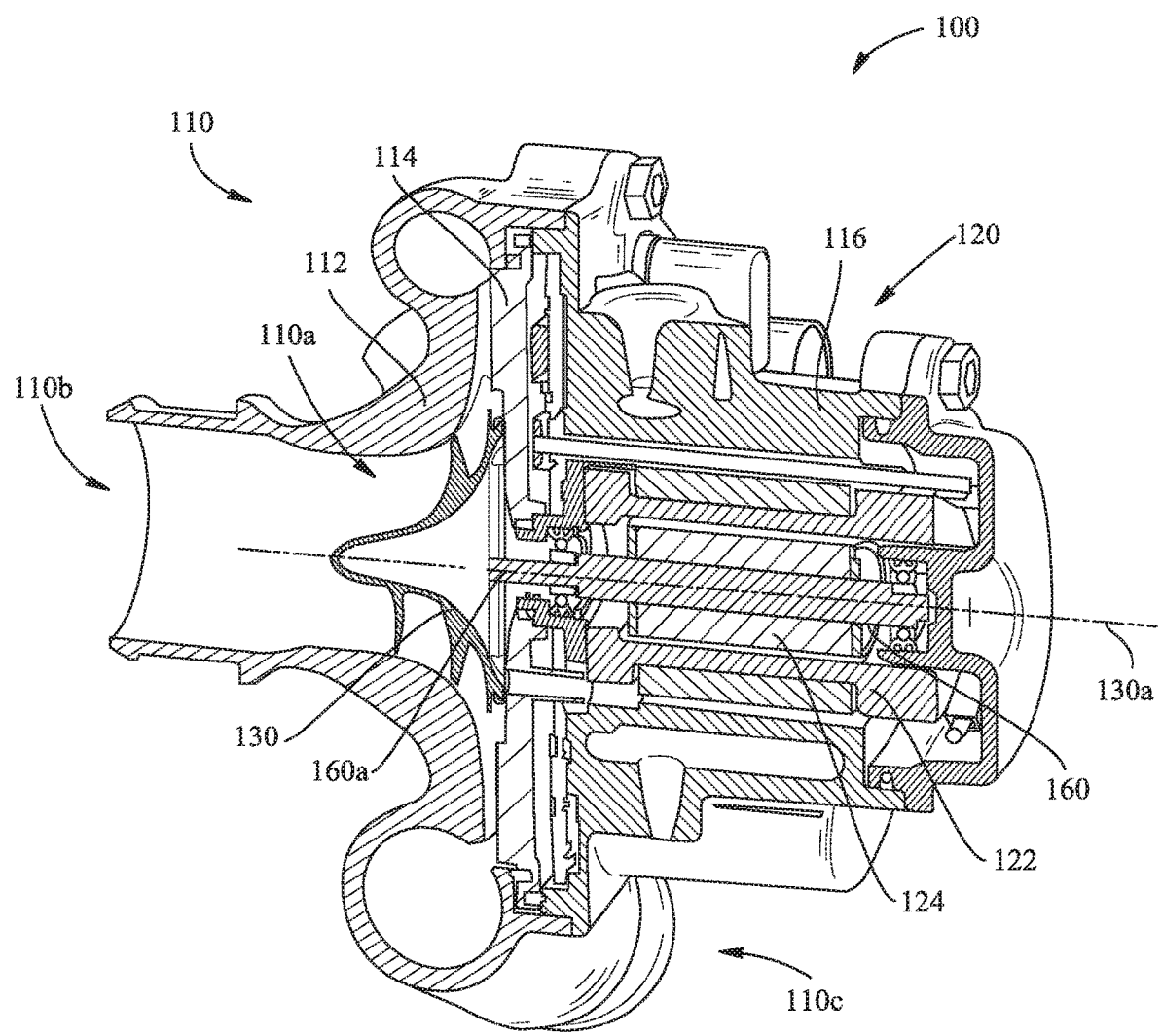
FIG. 1B is a cross-sectional view of a forced induction device of the powertrain.

Referring to FIG. 1B, the forced induction device 100 includes a housing 110, an electric motor 120, and a compressor wheel 130. The electric motor 120 rotates the compressor wheel 130 to draw ambient air into and expel compressed air from the housing 110. The forced induction device 100 may, for example, be referred to as a turbocharger or an electric turbocharger. The compressor wheel 130 may also be referred to as a compressor wheel assembly or an impeller assembly.

The housing 110 defines a cavity 110*a* (e.g., wheel cavity), an inlet 110*b* (e.g., axial inlet), and an outlet 110*c* (e.g., radial outlet). The compressor wheel 130 is positioned and rotates within the cavity 110*a*. When the compressor wheel 130 is rotated by the electric motor 120, the compressor wheel 130 draws air into the cavity 110*a* axially through the inlet 110*b*, and expels compressed air from the cavity 110*a* radially through the outlet 110*c*.

The housing 110 may, for example, include a housing cover 112 and a housing base 114. The housing cover 112 defines the inlet 110*b* and the outlet 110*c*. The inlet 110*b* is a conduit portion (e.g., tubular portion) that extends in an axial direction relative, such as parallel and/or coaxially with an axis 130*a* (e.g., central axis) of the compressor wheel 130 about which the compressor wheel 130 rotates. The outlet 110*c* is a volute portion that surrounds and defines the cavity 110*a*. The housing base 114 is coupled to the housing cover 112 opposite the inlet 110*b* to enclose the compressor wheel 130 in the cavity 110*a*.

The electric motor 120 is stably coupled to the housing 110 and operably coupled to the compressor wheel 130. The electric motor 120 is, for example, contained within a motor housing 116 of the housing 110. The electric motor 120 generally includes a stator 122 that is fixedly coupled to the motor housing 116 and a rotor 124 that is operably coupled to the compressor wheel 130 with a shaft 160. The electric motor 120 is powered by a power source, such as the engine 4 (e.g., from an alternator thereof). Further details of the shaft 160 are discussed in below.

Figure 2A:
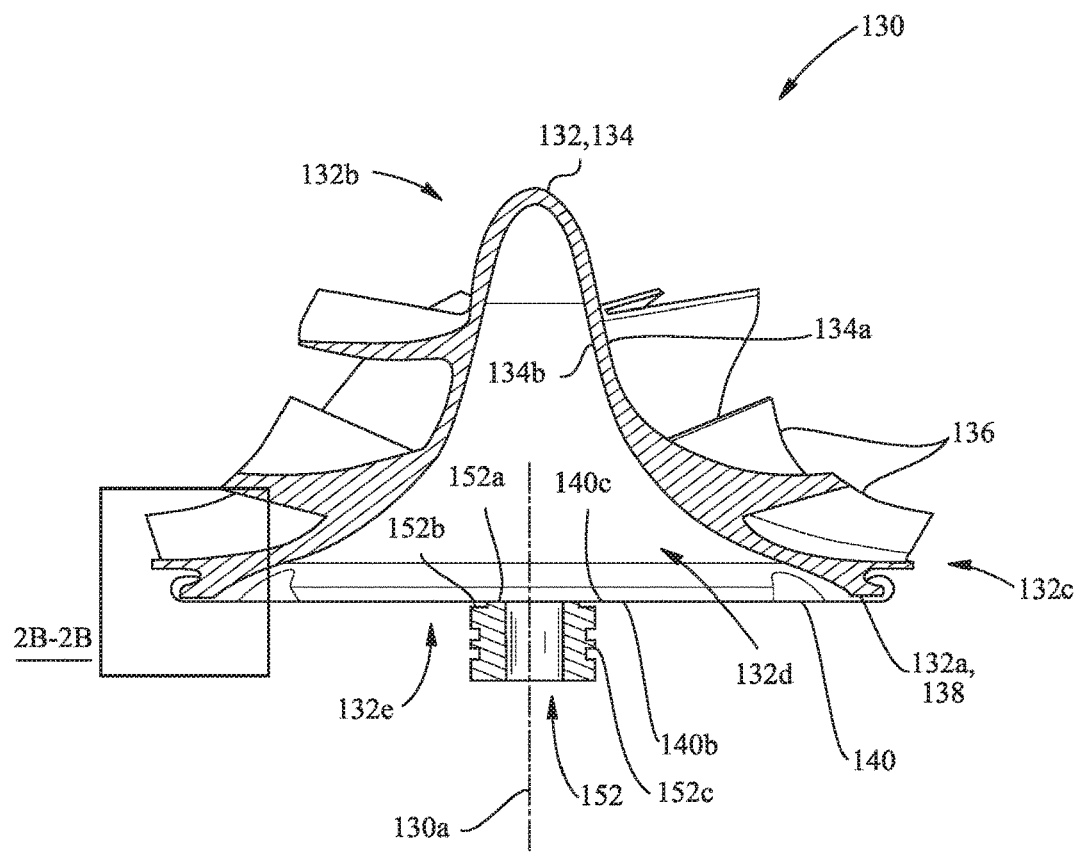
FIG. 2A is a cross-sectional view of a first embodiment compressor wheel of the forced induction device of FIG. 1B.
Figure 2B:
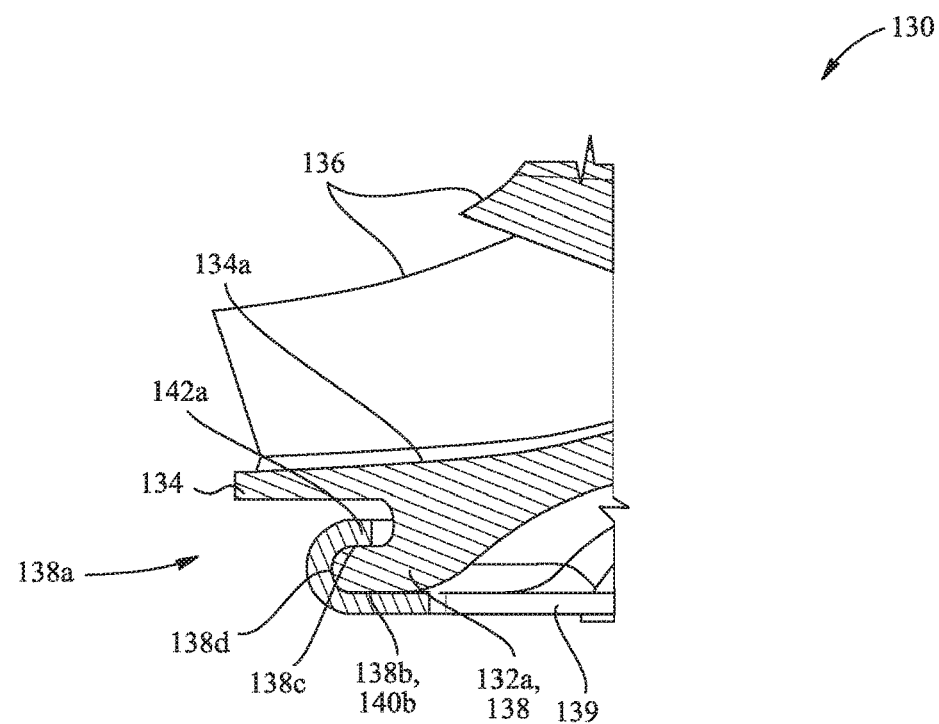
FIG. 2B is a detail view of the compressor wheel of FIG. 2A taken from box 2B-2B.
Figure 2C:
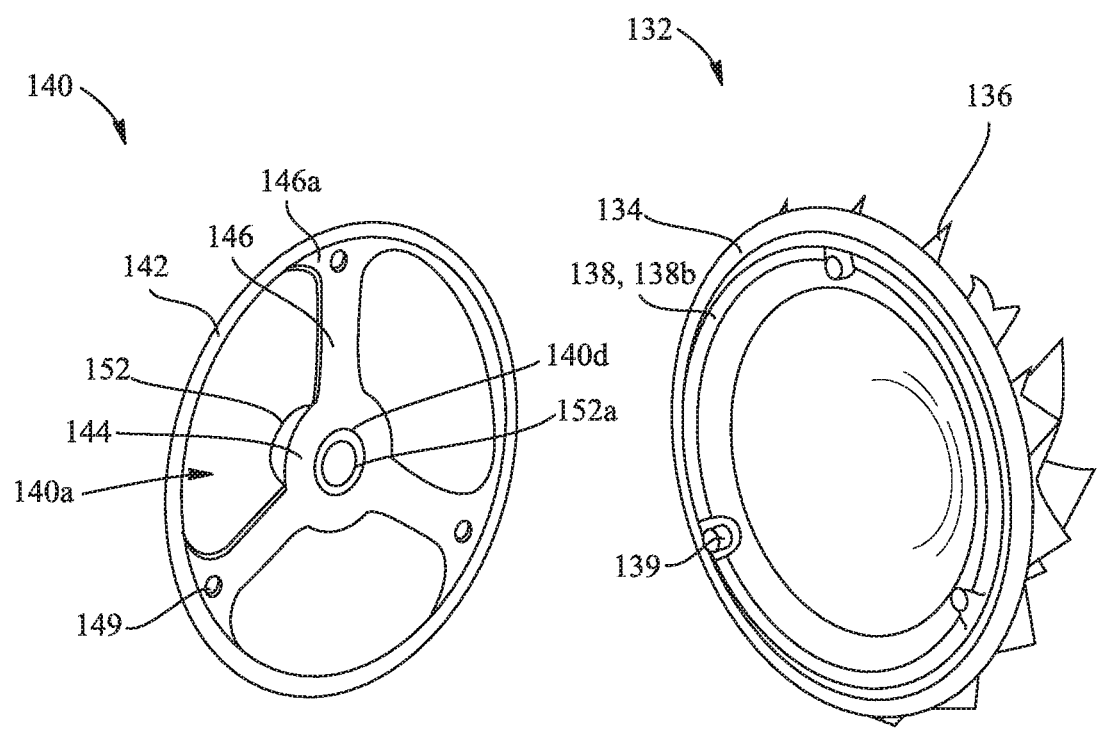
FIG. 2C is an exploded view of the compressor wheel of FIG. 2A.

Referring to FIGS. 2A-2C, the compressor wheel 130 is a multi-piece assembly that generally includes an impeller member 132 and a plate member 140 coupled to the impeller member 132 at an outer peripheral portion 132*a* thereof. The impeller member 132 may also be referred to as a wheel or polymer member, component, or structure. The plate member 140 may also be referred to as a carrier or metallic member, component, or structure.

The impeller member 132 extends axially from an inducer end 132*b* over which air is drawn axially into the cavity 110*a* to an exducer end 132*c* from which air is expelled radially from the cavity 110*a*. The impeller member 132 generally includes a hub portion 134 and a plurality of blades 136. The impeller member 132 is, for example, a unitary member formed of a polymer material (e.g., a composite, such as glass-filled nylon) by injection molding. As a result, the impeller member 132 may be considered or referred to as an injection molded member, component, or structure of which the hub portion 134 and the blades 136 are formed integrally with each other. The hub portion 134 may also be referred to as a hub.

The hub portion 134 extends continuously and widens moving from the inducer end 132*b* to the exducer end 132*c*. The hub portion 134 is also generally hollow being closed at the inducer end 132*b* and open at the exducer end 132*c*. With the inducer end 132*b* of the impeller member 132 being closed, the inducer end 132*b* may be shaped with a curved or sloping profile that may provide efficiency advantages due to improved aerodynamics as compared to compressor wheels or other components at the inducer end having flow restrictive profiles (e.g., flat). Alternatively, the inducer end 132*b* of the impeller member 132 (e.g., the hub portion 134) may be open, for example, having a bore extend therethrough for receipt of the shaft 160.

The hub portion 134 includes an outer surface 134*a* and an inner surface 134*b*. The outer surface 134*a* forms a generally convex shape with the blades 136 protruding outward therefrom. The blades 136 are coupled to and extend away from the outer surface 134*a* of the hub portion 134 (e.g., axially, radially, and/or tangentially). As referenced above, the blades 136 are formed integrally with the hub portion 134, for example, by injection molding. The blades 136 are configured to, as the compressor wheel 130 is rotated, draw air axially into the cavity 110*a* of the housing 110 and expel air radially therefrom.

The inner surface 134*b* forms a generally concave shape. More particularly, the inner surface 134*b* is axially recessed toward the inducer end 132*b* relative to the exducer end 132*c*. The inner surface 134*b*, thereby, defines a cavity 132*d* having an opening 132*e* at the exducer end 132*c* (e.g., the exducer end 132*c* of the impeller member 132 is open).

The hub portion 134 may have a substantially constant wall thickness, which is a minimum distance measured between the outer surface 134*a* and the inner surface 134*b* at locations therealong. The wall thickness may, for example, be measured in a generally perpendicular direction from one of the outer surface 134*a* or the inner surface 134*b* to the other. The hub portion 134 may vary in thickness and still be considered substantially constant, for example, by varying up to approximately 50% (e.g., 25%, 10%, or less) from a maximum thickness over a majority of the hub portion 134. This majority of the hub portion 134 over which the wall thickness is substantially constant may, for example, be a radial region of the hub portion 134, which may be defined as a percentage of the outer hub radius of the hub portion 134 relative to the axis 130*a* (e.g., starting at 0%, 10%, or 25% of the outer hub radius relative to the axis 130*a* and extending to 100%, 90%, or 75% of the outer hub radius). The hub portion 134 may additionally include various protruding or recessed features, while still being considered to have a constant wall thickness. Furthermore, the blades 136 may not considered part of the hub portion 134 or as forming part of the wall thickness of the hub portion 134.

The plate member 140 is connected to the impeller member 132 at the exducer end 132*c*, such that the impeller member 132 and the plate member 140 rotate with each other. As discussed below, the plate member 140 may be connected to the outer peripheral portion 132*a* of the impeller member 132 via one or more of a mechanical connection or a bonded connection. As discussed below, the outer peripheral portion 132*a* of the impeller member 132 to which the plate member 140 is connected may be at or near the radially outermost portion of the impeller member 132. The outer peripheral portion 132*a* is also arranged at the exducer end 132*c* of the impeller member 132. Furthermore, the plate member 140 may not be directly connected to the impeller member in a central region thereof, such as the inner surface 134*b* inward of the outer peripheral portion 132*a* (e.g., within an inner 75% of the outer hub radius relative to the axis 130*a*).

Still referring to FIGS. 2A-2C, the plate member 140 is a generally planar and circular structure that spans the opening 132e. The plate member 140 generally includes an outer plate portion 142 (e.g., radially outer or ring portion) and an inner plate portion 144 (e.g., radially inner portion). The outer plate portion 142 is connected to the impeller member 132, while the inner plate portion 144 is connected to the shaft 160. The plate member 140 is arranged substantially perpendicular to the axis 130a of the compressor wheel 130. The plate member 140 is, for example, a unitary member formed of a metal material (e.g., steel) by stamping. As a result, the plate member 140 may be referred to as a stamped component, member, or structure of which the outer plate portion 142 and the inner plate portion 144 are formed integrally with each other. The outer plate portion 142 may also be referred to as an outer ring structure or portion. The inner plate portion 144 may also be referred to as an inner ring structure or portion.

The plate member 140 may additionally include radial plate portions 146 that extend radially between the outer plate portion 142 and the inner plate portion 144. The radial plate portions 146 are circumferentially spaced apart from each other, so as to define apertures 140a extending through the plate member 140. As shown, for example, the plate member 140 includes three radial plate portions 146 that are positioned every 120 degrees about the axis 130a with three apertures 140a arranged between adjacent ones of the radial plate portions 146. The apertures 140a may be in communication with the cavity 132d of the impeller member 132 (e.g., such that air may be communicated through the apertures 140a to and from the cavity 132d). The radial plate portions 146 may also be referred to as spokes or spoke portions. The radial plate portions 146, when provided, may be formed integrally with the outer plate portion 142 and the inner plate portion 144 (e.g., by the stamping operation described previously). The radial plate portions 146 may additionally include transition portions 146a (e.g., fillets) or another form of a gradual transition (e.g., widening or tapering) from the outer plate portion 142 to reduce stress concentrations therebetween. Alternatively, the plate member 140 may be substantially continuous between the outer plate portion 142 and the inner plate portion 144 without the radial plate portions 146 being discretely formed or apertures 140a extending therethrough (see, e.g., plate member 240 in FIG. 3 or plate member 340 in FIG. 4, which have no apertures).

The outer plate portion 142 of the plate member 140 is connected to the impeller member 132, as referenced above, by one or more of a mechanical connection or a bonded connection about the outer peripheral portion 132a of the impeller member 132. The plate member 140 may additionally be mechanically connected to the impeller member 132 at circumferentially spaced locations radially inward of an outer periphery of the impeller member 132. These one or more connections between the impeller member 132 and the plate member 140 prevent movement therebetween, including relative translational movement in axial and radial directions and relative rotational movement. Furthermore, by these one or more connections, the plate member 140 restricts radial growth of the impeller member 132 that might otherwise occur due to centrifugal forces acting thereon from high rotational speeds of the compressor wheel 130 and lower stiffness of the impeller member 132 relative to the plate member 140.

In one implementation, the outer plate portion 142 extends radially around the outer peripheral portion 132a of the impeller member 132 to connect the plate member 140 to the impeller member 132. That is, the outer plate portion 142 extends radially outward and back radially inward against opposed surfaces of the outer peripheral portion 132a of the impeller member 132.

The impeller member 132 includes a flange portion 138 (e.g., circumferential flange portion) that forms the outer peripheral portion 132a of the impeller member 132. The flange portion 138 is spaced apart from the hub portion 134 and/or the blades 136. For example, as shown, the flange portion 138 may be spaced apart axially from the hub portion 134 and/or the blades 136. The radially outermost regions of the hub portion 134 and/or the blades 136 may, as shown, extend radially outward further than the flange portion 138. The flange portion 138 by extending in close radial proximity to the radially outermost portion of the hub portion 134 and/or the blades 136 is considered an outer peripheral portion (i.e., the outer peripheral portion 132a), for example, by having an outer radius that is 75%, 85%, 90%, 95%, or more of the outer hub radius of the hub portion 134. A channel 138a is arranged axially between outermost regions of the hub portion 134 and/or the blades 136 of the impeller member 132. The outer peripheral portion 132a as formed by the flange portion 138 may be formed by the injection molding process, as described above, so as to be integrally formed with the hub portion 134 and the blades 136. The outer peripheral portion 132a and the flange portion 138 may also be considered subportions of the hub portion 134.

The outer plate portion 142 of the plate member 140 is connected to the flange portion 138 of the impeller member 132. More particularly, the outer plate portion 142 is folded (e.g., crimped or rolled) radially around the flange portion 138. A first axial surface 138b (e.g., first axial impeller surface) of the flange portion 138, which faces toward the exducer end 132c, is mated against a first axial surface 140b of the outer plate portion 142 of the plate member 140, which faces toward the outer peripheral portion 132a. Both the first axial surface 138b and the first axial surface 140b may be planar. A second axial surface 138c (e.g., facing an inducer direction toward the inducer end 132b) of the flange portion 138, which faces toward the outer peripheral portion 132a, has received thereagainst a peripheral end 142a of the outer plate portion 142. The peripheral end 142a may additionally be received in the channel 138a to be located axially between the flange portion 138 and the hub portion 134 of the impeller member 132. The outer plate portion 142 of the plate member 140 may also engage a peripheral edge 138d (e.g., radially outward facing surface or edge) of the flange portion 138.

The flange portion 138 is compressed between the first axial surface 140b and the peripheral end 142a of the plate member 140 to mechanically connect the impeller member 132 to the plate member 140. This connection may prevent relative translational movement (e.g., in radial and axial directions), relative rotational movement, and relative radial growth between the impeller member 132 and the plate member 140. The region of the outer plate portion 142 folded around the flange portion 138 of the impeller member 132 may be referred to as a folded, crimped, or rolled portion and preferably extends entirely around the axis 130a (i.e., 360 degrees). The connection formed by the folded, crimped, or rolled portion may be referred to as a mechanical, folded, rolled, or crimped connection. The end also extends entirely around the axis 130a (i.e., 360 degrees).

Additionally, flange portions 138 of a common size (e.g., diameter) may be used on compressor wheels 130 of different geometries, for example, with impeller members 132 having larger and/or smaller maximum diameters of the hub portion 134 or the blades 136 from each other. As a result, plate members 140 of a common design (i.e., size) may be connected to different impeller members 132 of different geometries.

Figure 3:
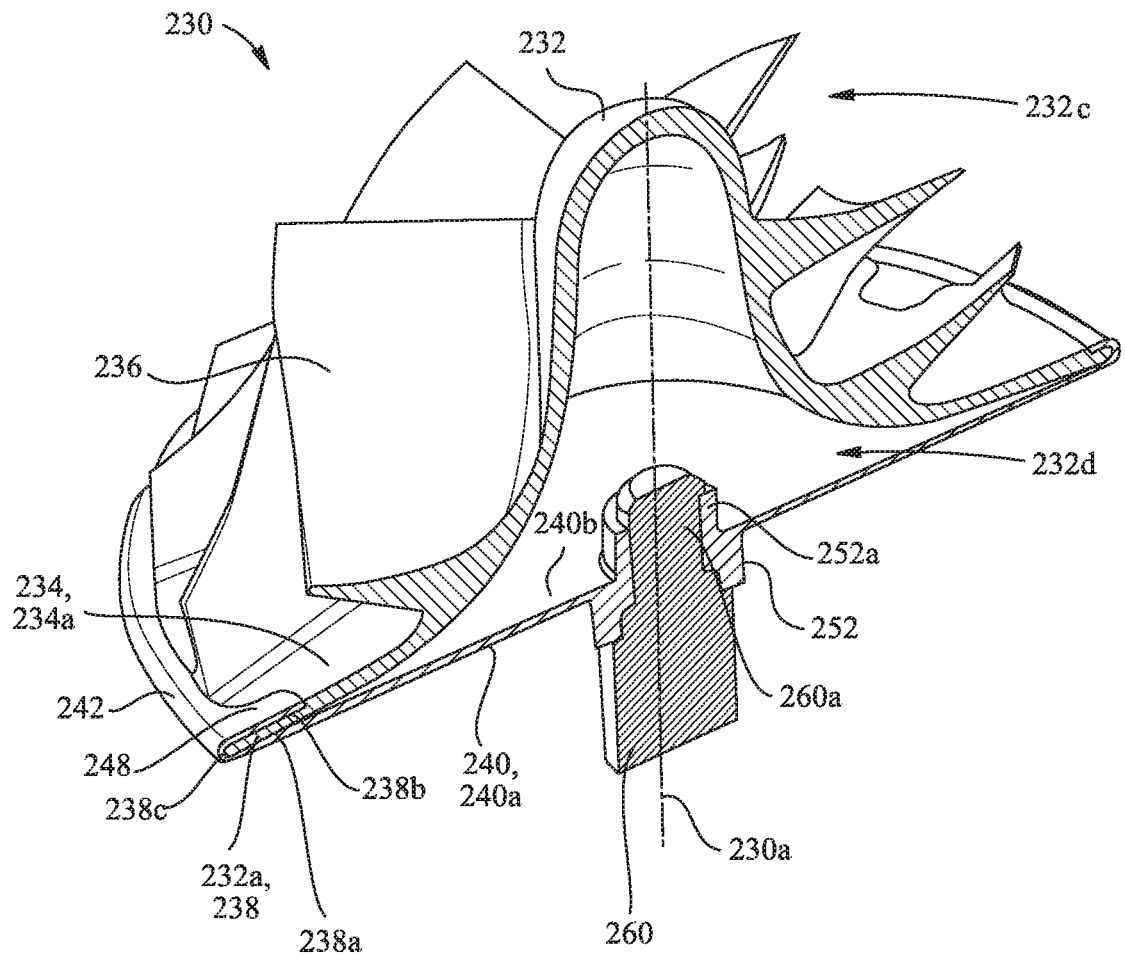
FIG. 3 is a perspective cross-sectional view of a second embodiment of a compressor wheel for use in the forced induction device shown in FIG. 1B.

Referring to FIG. 3, a compressor wheel 230 includes an impeller member 232 and a plate member 240. The impeller member 232 is configured substantially similar to the impeller member 132 described above, but rather than include the flange portion 138 spaced apart axially from the hub portion 134 and/or the blades 136, a hub portion 234 of the impeller member 232 extends radially beyond radial ends of blades 236 where connected to the hub portion 234. The hub portion 234, thereby, forms a flange portion 238 that forms an outer peripheral portion 232a to which the plate member 240 is connected. The outer peripheral portion 232a may extend to and from an outer circumference of the hub portion 234 of the impeller member 232.

The plate member 240 includes an outer plate portion 242 that is folded (e.g., crimped or rolled) radially around the flange portion 238 to connect the plate member 240 to the impeller member 232, as described above with respect to the plate member 140 and the impeller member 132 (e.g., to engage a first axial surface 238a, a second axial surface 238b, and/or a peripheral edge 238c of the flange portion 238). The portion of the outer plate portion 242 that is folded around the impeller member 232 may be referred to as a folded portion (e.g., rolled or crimped portion).

The plate member 240 may additionally include tabs 248 that extend from the folded portion. The tabs 248 are folded (e.g., crimped or rolled) against an outer surface 234a of the hub portion 234, for example, being received between the blades 236. The tabs 248 may be spaced circumferentially equally about an axis 230a of the compressor wheel 230 (e.g., in a subsection of gaps between the blades 236 or between all blades 236).

Figure 4:
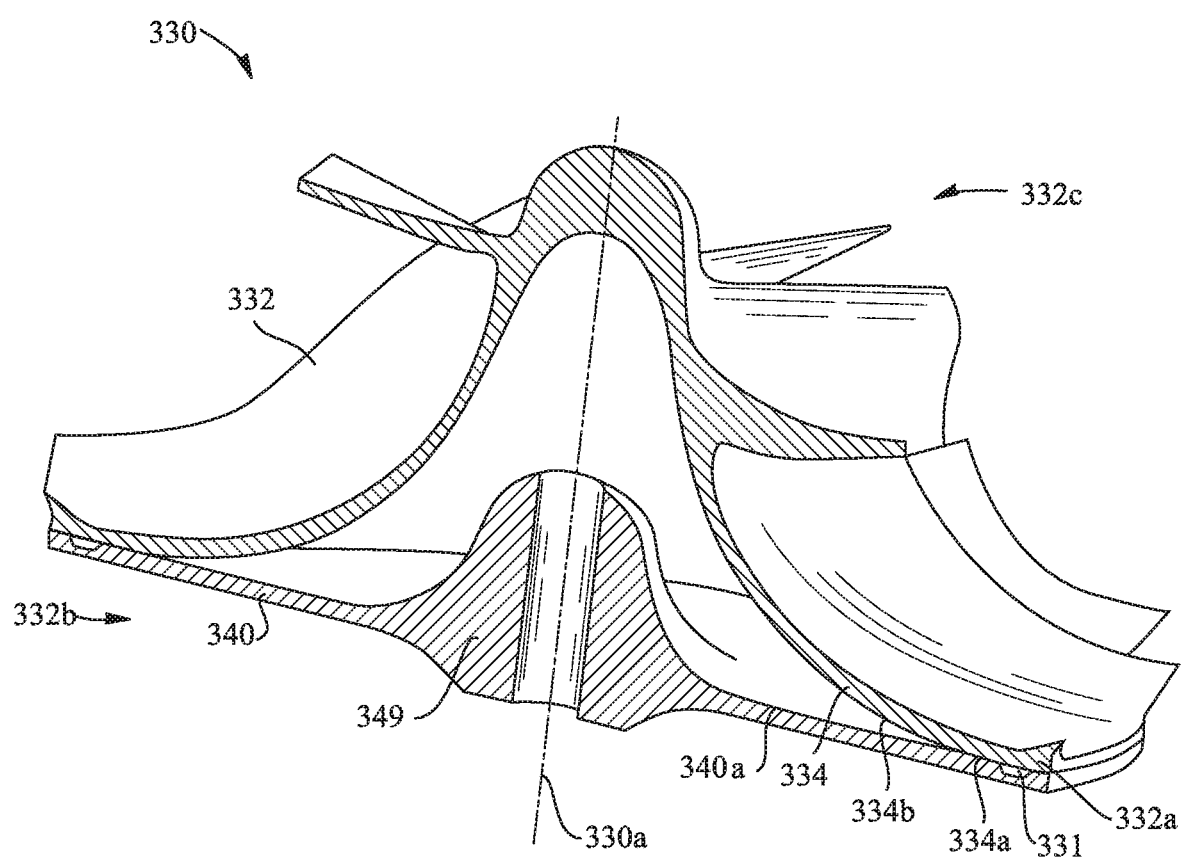
FIG. 4 is a perspective cross-sectional view of a third embodiment of a compressor wheel for use in the forced induction device shown in FIG. 1B.

Referring to FIG. 4, a compressor wheel 330 includes an impeller member 332 and a plate member 340 that is bonded to an outer peripheral portion 332a of the impeller member 332 with an adhesive 331 (e.g., bonding agent). The impeller member 332 is configured substantially similar to the impeller member 132 but omits the flange portion 138. Instead, the impeller member 332 includes a hub portion 334 configured substantially as described above and which includes an axial face 334a. The axial face 334a faces axially toward an exducer end 332b of the compressor wheel 330 and is substantially planar to form a mating surface to receive the plate member 340 thereagainst. The axial face 334a forms a surface of the outer peripheral portion 332a of the impeller member 332. The axial face 334a may extend continuously from an inner surface 334b of the hub portion 334, which is spaced axially away from the plate member 340. Blades 336 may be radially coextensive with the hub portion 334 (e.g., where extending from the hub portion 334).

The plate member 340 is configured substantially similar to the plate member 140 but omits the folded portion. Instead, the plate member 340 includes a first axial face 340a that faces an inducer end 332c of the compressor wheel 330. The first axial face 340a mates against and is bonded with the axial face 334a of the impeller member 332. For example, the first axial face 340a of the plate member 340 is substantially planar. The plate member 340 may also be radially coextensive with the outer peripheral portion 332a of the impeller member 332 (e.g., having a common diameter therewith), for example, extending to an outer circumference of a hub portion of the impeller member. The plate member 340 may also be radially coextensive with the blades 336 of the impeller member 332.

The axial face 334a of the impeller member 332 is bonded to the first axial face 340a of the plate member 340, for example, with the adhesive 331. The adhesive 331 is arranged radially proximate the outer peripheral portion 332a of the impeller member 332 and may extend entirely around an axis 330a of the compressor wheel 330 (i.e., 360 degrees). For example, the adhesive 331 may originate at the outer peripheral portion 332a and extend radially inward therefrom, such that the impeller member 332 and the plate member 340 are considered connected at the outer peripheral portion 332a. Alternatively, as shown, the adhesive 331 may originate slightly radially inward of the outer peripheral portion 332a, such that the plate member 340 may still be considered connected to the outer peripheral portion 332a of the impeller member 332. The connection formed by the adhesive may be referred to as a bonded connection. The bonded connection prevents translational axial movement, translational radial movement, rotational movement, and relative radial expansion between the impeller member 332 and the plate member 340.

The adhesive 331 is suitable for bonding (e.g., adhering) to both the polymer material of the impeller member 332 and the metal material of the plate member 340.

By using the adhesive 331 to connect the impeller member 332 to the plate member 340, the plate member 340 may not require subsequent processing (e.g., folding, rolling, or crimping) to be connected to the impeller member 332. Furthermore, the plate member 340 may be formed of different materials and/or by different processes (e.g., being a cast metal) that may otherwise not have suitable material properties (e.g., ductility and/or malleability) for being folded, rolled, or crimped. The adhesive 331 may, however, also be used in conjunction with the compressor wheel 130 (e.g., being between axially facing surfaces of the flange portion 138 of the impeller member 132 and the outer plate portion 142 of the plate member 140) and the compressor wheel 230 (e.g., between the axially facing surfaces of the flange portion 238 and/or the hub portion 234 of the impeller member 232 and the outer plate portion 242 of the plate member 240).

Referring again to FIGS. 2A-2C, the compressor wheels 130, 230, and/or 330 may also include mating features that locate and/or mechanically connect the impeller members 132, 232, 332 and the respective plate members 140, 240, 340. As shown in FIGS. 2A-2C, the mating features include pairs of mating features (e.g., sets of mating features) that are circumferentially and radially spaced equally relative to the axis 130a of the compressor wheel 130. Each pair of mating features may, for example, include a male feature 139 of the impeller member 132 and a female feature 149 of the plate member 140. The male feature 139 may, for example, be a protrusion (e.g., peg, post, drive pin) that protrudes axially (e.g., parallel with the axis 130a) from the inner surface 134b of the hub portion 134. The male feature 139 is radially positioned at an outer location (e.g., proximate but radially inward of the flange portion 138). The male feature 139 may be formed integrally with the impeller member 132 (e.g., by injection molding). For receipt of the male feature 139 by the female feature 149, the male feature 139 protrudes axially beyond the first axial surface 138b of the flange portion 138 of the impeller member 132. The female feature 149 may, for example, be a hole (e.g., aperture) or recess in the plate member 140. The female feature 149 is radially positioned at a common location to the male feature 139. For example, the female feature 149 may be positioned in the outer plate portion 142, the radial plate portion 146, and/or the transition portion 146a therebetween. During assembly, the mating features engage each other to locate the plate member 140 radially and rotationally relative to the impeller member 132. During operation, the mating features may engage each other to mechanically connect the plate member 140 to the impeller member 132 (e.g., to prevent radial translation and relative rotation therebetween). The mating features extend axially and may be referred to as axially-extending mating features. The mating features may also be incorporated similarly into the compressor wheel 230 and the compressor wheel 330.

The compressor wheels 130, 230, 330 disclosed herein are also configured to couple to the shaft 160 to be rotated thereby. Referring again to FIGS. 2A and 2C, the compressor wheel 130 additionally includes a mounting member 152 that is coupled to the plate member 140 and the shaft 160. The mounting member 152 may, for example, be an internally-threaded member (e.g., a nut) that extends coaxially with the axis 130a of the compressor wheel 130. The mounting member 152 threadably receives a proximal end 160a of the shaft 160 to couple the compressor wheel 130 to the shaft 160 (see FIG. 1B). Threaded receipt of the shaft 160 by the mounting member 152 may allow the shaft 160 to transfer torque to the mounting member 152 and, thereby, the compressor wheel 130, and may also axially locate the shaft 160 relative to the mounting member 152 and, thereby, the compressor wheel 130.

The mounting member 152 is formed separately from the plate member 140 and is connected to the inner plate portion 144 in a suitable manner to transfer torque and ensure proper alignment between the compressor wheel 130 and the shaft 160. As shown in FIG. 2A, the mounting member 152 is attached to and extends away from a first axial surface 140b of the inner plate portion 144, which faces away from the impeller member 132. For example, the mounting member 152 may be attached to the inner plate portion 144 with an adhesive or by welding.

The mounting member 152 may, in some embodiments, extend into a central aperture 140d of the plate member 140 (see FIG. 2C), which may function to radially locate the mounting member 152 coaxially with the plate member 140. For example, the mounting member 152 includes an end portion 152a having a reduced diameter relative to a shoulder portion 152b (e.g., extending radially outward perpendicular to the axis 130a), the end portion 152a being received by the central aperture 140d and the shoulder portion 152b engaging the first axial surface 140b. The end portion 152a extends less than or equal to a thickness of the plate member 140, so as to not extend beyond a second axial surface 140c (i.e., facing the impeller member 132). The proximal end 160a of the shaft may extend partially into the mounting member 152, so as to not extend axially beyond the second axial surface 140c of the plate member 140, or further therethrough.

The mounting member 152 may additionally include a flinger portion 152c. The flinger portion 152c forms a flinger, as understood in the art. The flinger portion 152c extends axially away from the shoulder portion 152b in a direction away from the impeller member 132. When assembled in the forced induction device 100, the flinger portion 152c may be surrounded by (e.g., protrude into an aperture of) the housing base 114.

Alternatively, as shown in FIG. 3, the compressor wheel 230 may include a mounting member 252 configured substantially similar to the mounting member 152 but with an end portion 252a that extends beyond a second axial surface 240b of the plate member 240. A proximal end 260a of a shaft 260 may extend beyond the second axial surface 240b and the mounting member 252 (e.g., to protrude therefrom) and into a cavity 232d (refer to cavity 132d) defined by the hub portion 234 of the impeller member 232. The mounting member 252 may include a flinger portion (as described above). The mounting member 252 may be used in conjunction with the plate member 240. As with the shaft 160 being threadably received by the mounting member 152, the shaft 260 may be threadably received by the mounting member 252.

In a still further alternative embodiment, as shown in FIG. 4, the compressor wheel 330 includes a mounting portion 349, which is formed integrally with the plate member 340 but otherwise configured similar to the mounting member 152 to receive and couple to the shaft 160 or the mounting member 252 to receive and couple to the shaft 260.

For each of the compressor wheels 130, 230, 330, the shafts 160, 260, as the case may be, do not extend entirely through and protrude from the inducer end 132b, 232c, 332c of the impeller members 132, 232, 332 thereof. As a result, the compressor wheels 130, 230, 330 may be considered boreless (i.e., do not have a central bore extending entirely therethrough and having a shaft extending entirely therethrough).

Figure 5:
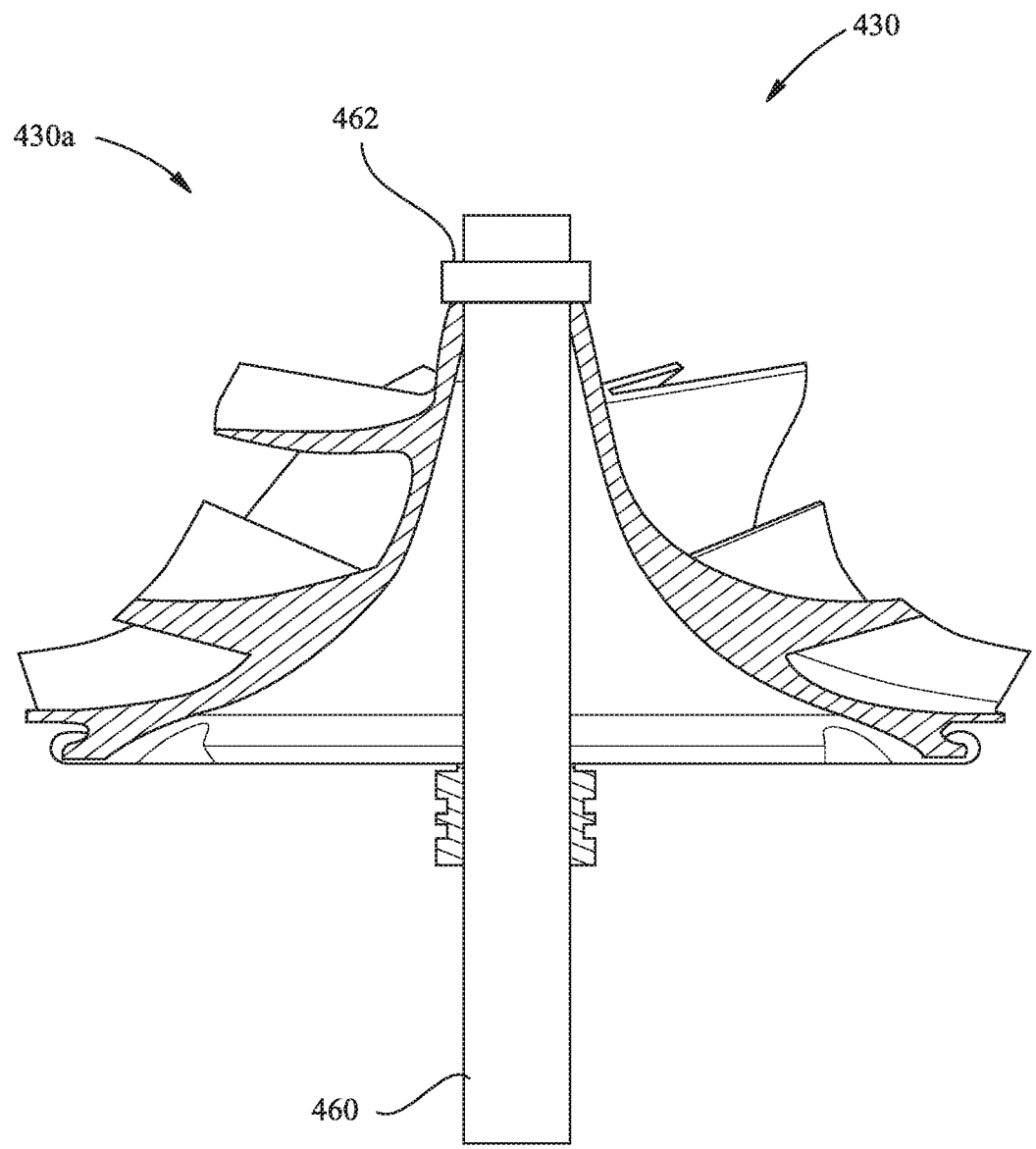
FIG. 5 is a cross-sectional view of a fourth embodiment of a compressor wheel for use in the forced induction device shown in FIG. 1B.

In a still further embodiment, shown in FIG. 5, a compressor wheel 430 is configured substantially similar to the compressor wheel 130 but instead is considered to be bored by having a shaft 460 extend entirely therethrough and protrude from an inducer end 430a to receive a nut 462 to couple the shaft 460 to the compressor wheel 430. Variants of the compressor wheels 230, 330 may be similarly configured to receive the shaft 460 therethrough.

Figure 6:
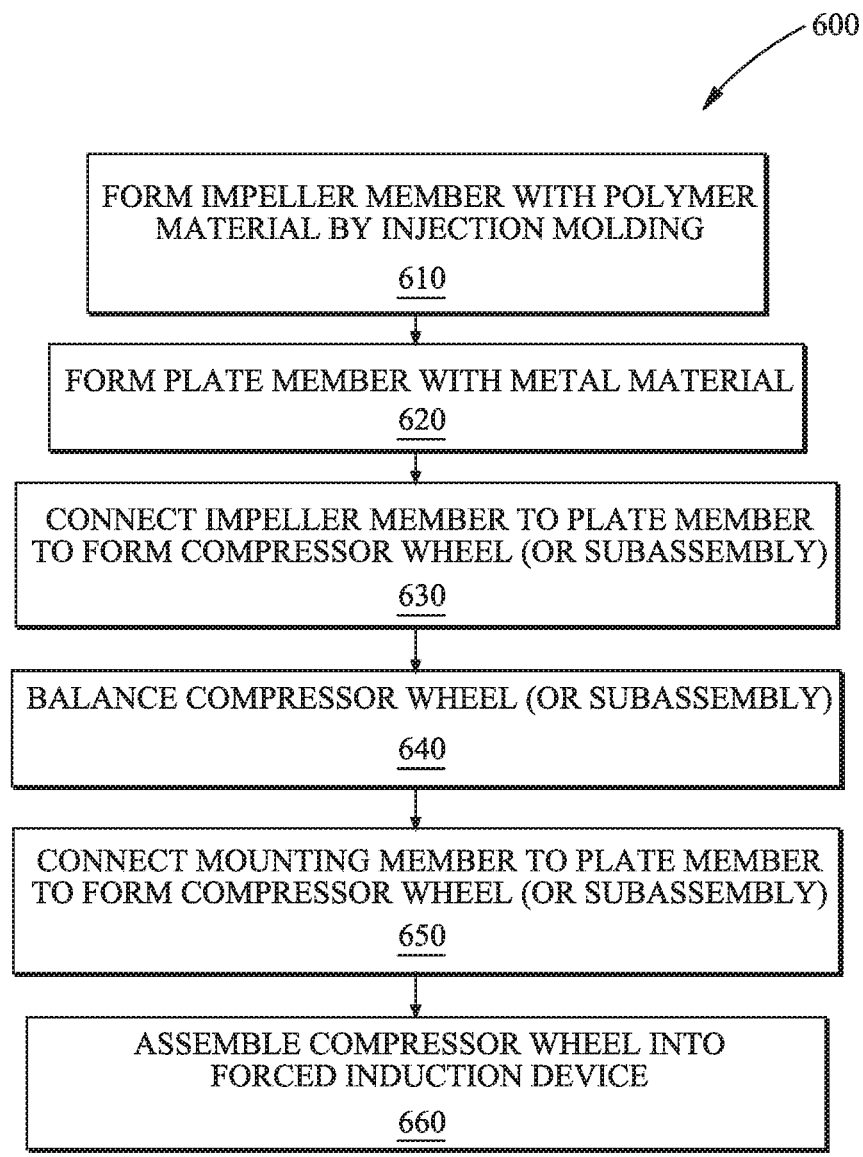
FIG. 6 is a flow chart of a method for creating a forced induction device.

Referring to FIG. 6, a method 600 is directed to providing a forced induction device or a compressor wheel thereof. In a first operation 610, an impeller member is formed of a polymer material by injection molding. The impeller member may be any of the impeller members 132, 232, 332 described above or the described variations thereof. In a second operation 620, a plate member is formed of a metal material. The plate member may be any of the plate members 140, 240, 340 described above or the described variations thereof. The plate member may be formed, at least in part, by a stamping operation or a casting operation. In a third operation 630, the impeller member and the plate member are connected to each other to form a wheel subassembly, or the compressor wheel (e.g., if including the plate member 340). The impeller member and the plate member may be connected to each other in one or more of the manners described above (e.g., folding/rolling/crimping, bonding, and/or mating features). In a fourth operation 640, which occurs after the third operation 630, the compressor wheel assembly is balanced by one of removing material from the plate member or affixing a weighted material thereto. In a fifth operation 650, a mounting member is connected to the plate member. The mounting member may be any one of the mounting members 152 or 252. The fifth operation 650 may occur before the third operation 630 (i.e., before connecting the impeller member to the plate member) in which case a plate subassembly is formed of the plate member and the mounting member, or may occur after the third operation in which case the compressor wheel is formed of the impeller member, the plate member, and the mounting member. The fifth operation 650 may occur before or after the fourth operation 640 (i.e., before or after balancing the compressor wheel assembly). In a sixth operation 660, the compressor wheel resultant from the first through fifth operations 610-650 is assembled into the forced induction device (e.g., being connected to a shaft and enclosed in a housing). The shaft may be any one of the shafts 160, 260, 460. The housing may be the housing 110.

Figure 7:
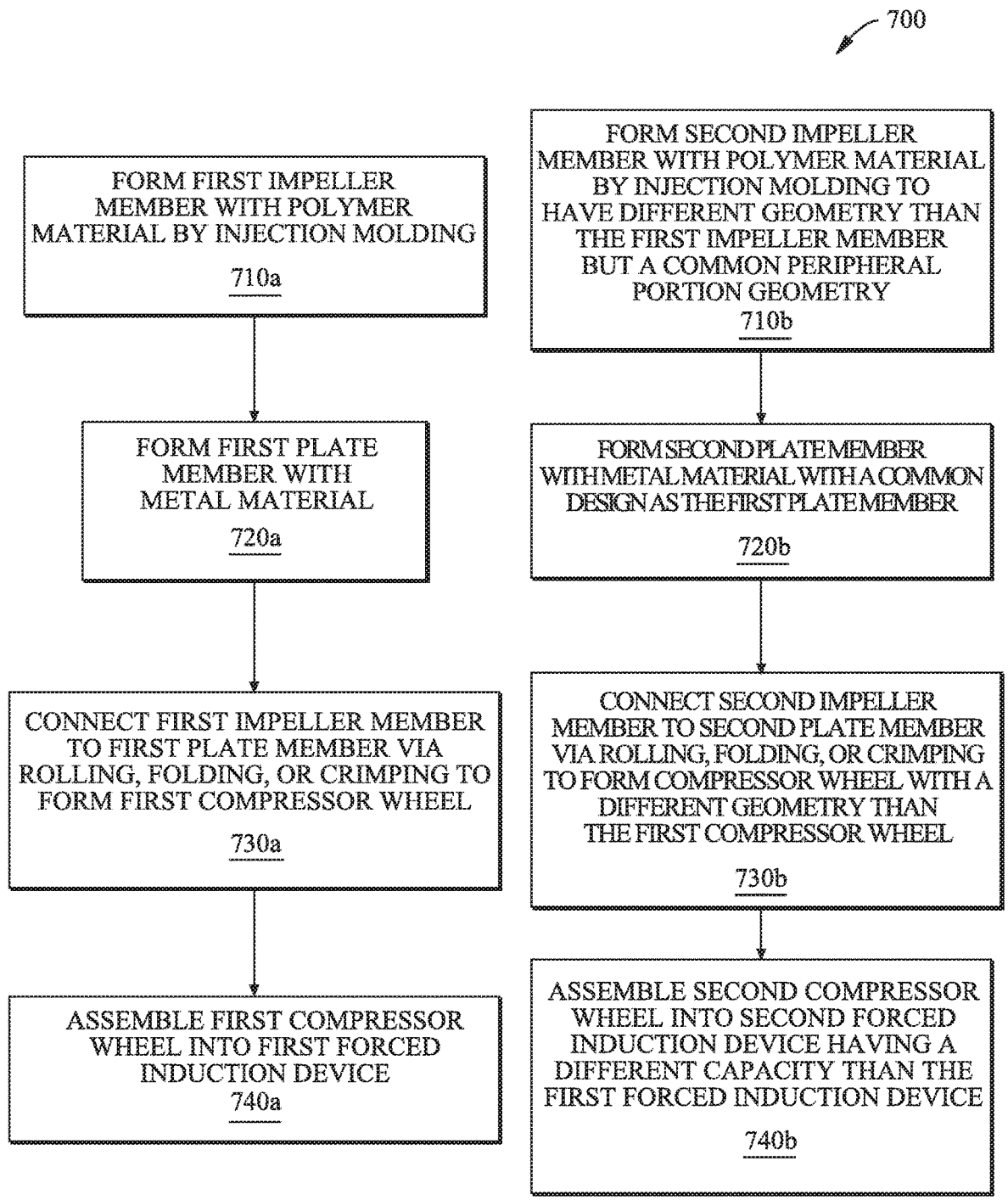
FIG. 7 is a flow chart of a method for providing multiple forced induction devices with different capacities.

Referring to FIG. 7, a method 700 is directed to providing multiple compressor wheels of different geometries (or sizes) and forced induction devices with different capacities (e.g., flow rate and/or pressure output). In a first suboperation 710a, a first impeller member is formed of a polymer material by injection molding. In another first suboperation 710b, a second impeller member is formed of a polymer material by injection molding with a different geometry (e.g., hub diameter) but with a common geometry of the outer peripheral portion thereof (e.g., common flange diameter). In a second suboperation 720a, a first plate member is formed of a metal material. In another second suboperation 720b, a second plate member is formed of a metal material with a common design as the first plate member. In a third suboperation 730a, the first plate member is connected to the first impeller member via rolling, folding, or crimping the plate member around the outer peripheral portion of the first impeller member to form a first compressor wheel. In another third suboperation 730b, the second plate member is connected to the second impeller member via rolling, folding, or crimping the plate member around the outer peripheral portion of the first impeller member to form a second compressor wheel with a different geometry than the first compressor wheel. In a fourth suboperation 740a, the first compressor wheel is assembled into a first forced induction device. In another fourth suboperation 740b, the second compressor wheel is assembled into a second forced induction device having a different capacity than the first forced induction device. Each of the first compressor wheel and the second compressor wheel may be subject to the further operations in the method 600 (e.g., connecting a mounting member and/or balancing the compressor wheel).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A compressor wheel assembly for a forced induction device, the compressor wheel assembly comprising:
   an impeller member formed of a polymer material and having a hub portion and a plurality of blades extending from an outer surface of the hub portion, the hub portion having an outer peripheral portion formed therewith; and
   a plate member connected to the outer peripheral portion of the impeller member to be rotationally fixed thereto, the impeller member and the plate member being formed as discrete components of the compressor wheel assembly, the plate member being formed of a metal material.

2. The compressor wheel assembly according to claim 1, wherein a first axial surface of the plate member is mated against a first axial surface of the impeller member.

3. A compressor wheel assembly for a forced induction device, the compressor wheel assembly comprising:
   an impeller member formed of a polymer material and having a hub portion and a plurality of blades extending from an outer surface of the hub portion, the hub portion having an outer peripheral portion formed therewith; and
   a plate member connected to the outer peripheral portion of the impeller member to be rotationally fixed thereto, the plate member being formed of a metal material, wherein a first axial surface of the plate member is mated against a first axial surface of the impeller member and the impeller member includes a flange portion that forms the outer peripheral portion, and the plate member extends radially around the flange portion to connect the plate member to the impeller member.

4. The compressor wheel assembly according to claim 3, wherein the plate member extends circumferentially entirely around the flange portion.

5. The compressor wheel assembly according to claim 4, wherein the flange portion extends axially away from the hub portion.

6. The compressor wheel assembly according to claim 4, wherein the flange portion extends radially outward beyond the blades where coupled to the hub portion.

7. The compressor wheel assembly according to claim 6, wherein the first axial surface of the plate member is bonded to the first axial surface of the impeller member.

8. The compressor wheel assembly according to claim 1, further comprising sets of mating features at locations that are circumferentially spaced equally about a central axis of the impeller member and are radially spaced equally from the central axis and proximate the outer peripheral portion.

9. A compressor wheel assembly for a forced induction device, the compressor wheel assembly comprising:
   an impeller member formed of a polymer material and having a hub portion and a plurality of blades extending from an outer surface of the hub portion, the hub portion having an outer peripheral portion formed therewith;
   a plate member connected to the outer peripheral portion of the impeller member to be rotationally fixed thereto, the plate member being formed of a metal material; and
   sets of mating features at locations that are circumferentially spaced equally about a central axis of the impeller member and are radially spaced equally from the central axis and proximate the outer peripheral portion, wherein each set of mating features includes a protrusion formed integrally with the impeller member and protruding axially therefrom, and one of a recess or an aperture extending axially into the plate member.

10. The compressor wheel assembly according to claim 9, wherein the outer peripheral portion has an outer radius that is at least 75% of an outer hub radius of the hub portion.

11. The compressor wheel assembly according to claim 10, wherein the plate member is not connected to any portion of the impeller member located within 50% of the outer hub radius from an axis of the impeller member.

12. The compressor wheel assembly according to claim 1, further comprising a shaft, wherein the plate member includes an inner portion coupled to the shaft, an outer plate portion connected to the outer peripheral portion of the impeller member, and radial plate portions that extend radially between the inner portion and the outer plate portion and are circumferentially spaced equally about an axis of the compressor wheel assembly.

13. The compressor wheel assembly according to claim 1, wherein the impeller member is an injection molded component, and the plate member is a stamped component.

14. The compressor wheel assembly according to claim 1, wherein the impeller member is hollow, and the hub portion has a substantially constant wall thickness.

15. The compressor wheel assembly according to claim 13, wherein the hub portion extends continuously from the inducer end to the exducer end, the inducer end is closed, and the exducer end is open.

16. A compressor wheel assembly for a forced induction device, the compressor wheel assembly comprising:
- an impeller member formed of a polymer material and having a hub portion and a plurality of blades extending from an outer surface of the hub portion, the hub portion having an outer peripheral portion formed therewith; and
- a plate member connected to the outer peripheral portion of the impeller member to be rotationally fixed thereto, the plate member being formed of a metal material, wherein a first axial surface of the plate member is mated against a first axial surface of the impeller member;
- wherein the outer peripheral portion extends to within 25% of a radius of an outer circumference of the impeller member;
- wherein the impeller member is an injection molded component, and the plate member is a stamped component; and
- wherein the plate member is connected to the outer peripheral portion of the impeller member by at least one of crimping or bonding.

17. A forced induction device comprising:
a compressor wheel comprising:
- an impeller member formed of a polymer material, the impeller member extending from an inducer end to an exducer end and having a plurality of blades; and
- a plate member formed of a metal material and connected to an outer peripheral portion of the impeller member at the exducer end continuously therearound;
an electric motor; and
a housing in which the compressor wheel is rotated by the electric motor to draw air axially into the housing at the inducer end and to expel air radially out of the housing at the exducer end, wherein the impeller member is hollow, the plate member is planar, and the plate member is crimped around the outer peripheral portion of the impeller member.

18. A method of manufacturing compressor wheels for forced induction devices comprising:
- injection molding an impeller member with a polymer material, wherein the impeller member includes a hub portion extending continuously from an inducer end to an exducer end, the hub portion having a substantially constant wall thickness and blades extending from an outer surface thereof;
- forming a plate member of a metal material such that the impeller member and the plate member constitute discrete components of each compressor wheel;
- connecting the plate member to the impeller member at the exducer end to form a compressor wheel; and
- balancing the compressor wheel by removing a portion of the metal material from the plate member.

19. The method according to claim 18, further comprising injection molding another impeller member having a different geometry from the impeller member, forming another plate member such that the plate member and the another plate member share common designs, and connecting the another plate member to the another impeller member to form another compressor wheel.

* * * * *